No. 797,385. PATENTED AUG. 15, 1905.
G. A. TROXLER.
POTATO DIGGER.
APPLICATION FILED JULY 20, 1904.

UNITED STATES PATENT OFFICE.

GEORGE A. TROXLER, OF CENTERVILLE, CONNECTICUT, ASSIGNOR OF ONE-HALF TO ISAAC N. PORTER, OF NEW HAVEN, CONNECTICUT.

POTATO-DIGGER.

No. 797,385.     Specification of Letters Patent.     Patented Aug. 15, 1905.

Application filed July 20, 1904. Serial No. 217,370.

*To all whom it may concern:*

Be it known that I, GEORGE A. TROXLER, a citizen of the United States, residing at Centerville, in the county of New Haven and State of Connecticut, have invented a new and useful Improvement in Potato-Diggers; and I do hereby declare the following, when taken in connection with the accompanying drawings and the numerals of reference marked thereon, to be a full, clear, and exact description of the same, and which said drawings constitute part of this specification, and represent, in—

Figure 1:
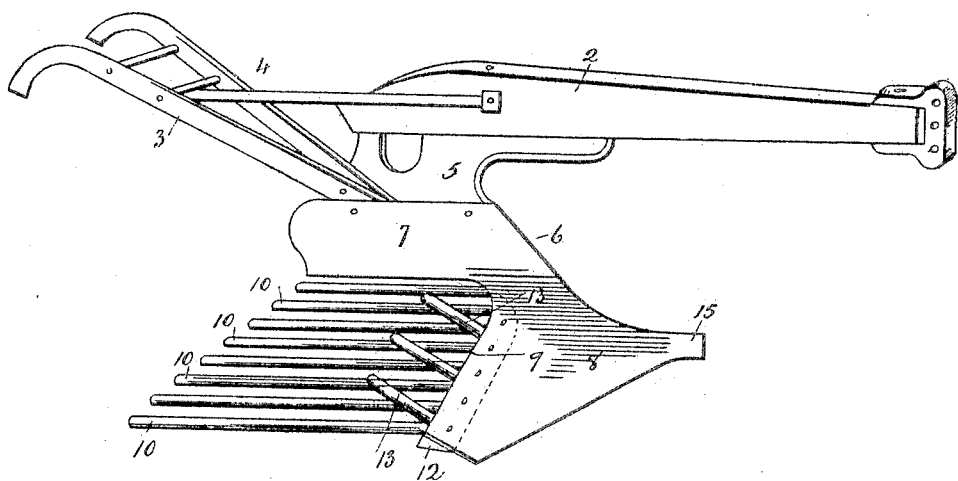
Figure 2:
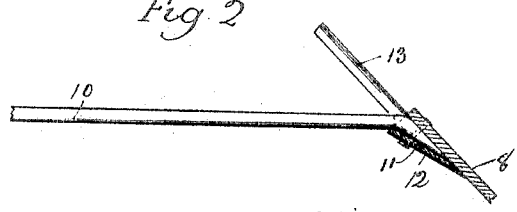
Figure 3:
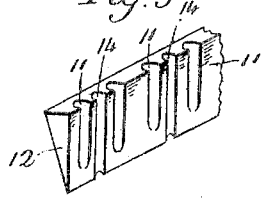

Figure 1, a perspective view of a potato-digger constructed in accordance with my invention; Fig. 2, a longitudinal sectional view showing means for securing the rearwardly-extending arms and upwardly-inclined fingers to the share; Fig. 3, a perspective view of a clamping-bar for securing the arms and fingers to the share.

This invention relates to an improvement in potato-diggers, and particularly to the turning-plow type, the object being a simple arrangement of parts in connection with the plowshare, whereby the potatoes will be lifted out of the holes and left upon the surface of the ground; and the invention consists in the construction as hereinafter described, and particularly recited in the claims.

As shown in the accompanying illustration, in carrying out my invention I employ a plow having a beam 2, handles 3 4, standard 5 of substantially usual construction, and an integral combined share and moldboard 6. The moldboard portion 7 is connected with the standard and is substantially vertical and extends rearward outside the lower ends of the handles, which are secured between the moldboard and the standard, while the share portion 8 is made wider than for ordinary plows, and its rear edge 9 is made substantially straight. Projecting rearward from this edge of the share are arms 10, more or less in number, and arranged in a horizontal plane and parallel with the rearward extension of the moldboard. These arms are round rods bent at their forward ends, which extend into notches 11, formed in a bar 12, secured to the under side of the share 8 at its rear edge. Preferably and as herein shown I provide a number of fingers 13, which extend upward and incline rearward from the rear edge of the share 8. These fingers extend into grooves or channels 14 in the bar 12, whereby they are also clamped to the under face of the share. The point 15 of the plow may be formed integral with the share or may be a removable point, as common in plows.

In operation the point of the share will extend into the ground to a sufficient extent to pass below the potatoes in the hills, and as the plow moves forward the potatoes and earth will be lifted by the share, and the earth and weeds or tops will be loosened and partially separated by the fingers 13, from whence they will pass on to the arms 10. These arms will be arranged sufficiently far apart to permit the earth to fall between them, while the potatoes will rest upon them until crowded off from their rear ends, thus leaving the potatoes comparatively clean and upon the surface of the ground.

Having fully described my invention, what I claim as new, and desire to secure by Letters Patent, is—

1. A potato-digger comprising a beam, handles, standard, and an integral combined moldboard and share, the share portion formed with a straight rear edge extending from one side of the moldboard portion and the moldboard portion extending rearward from the rear edge of the share portion and at substantially a right angle thereto, in combination with horizontally-arranged arms connected with the said share portion and extending rearwardly therefrom parallel with the rearward extension of the moldboard portion substantially as described.

2. A potato-digger comprising a beam, handles, standard, and an integral combined moldboard and share arranged at one side of the beam, the share portion extending from one side of the moldboard portion and formed with a straight rear edge and the moldboard portion extending rearward from the rear edge of the share portion and at substantially a right angle thereto combined with a series of horizontally-arranged arms connected with said share portion and extending rearward therefrom parallel with the rearward extension of the moldboard portion, and a series of fingers extending upwardly and rearwardly from the rear edge of said share portion, substantially as described.

In testimony whereof I have signed this specification in the presence of two subscribing witnesses.

GEORGE A. TROXLER.

Witnesses:
FREDERIC C. EARLE,
CLARA L. WEED.